Patented Apr. 27, 1937

2,078,269

UNITED STATES PATENT OFFICE 2,078,269

ARTIFICIAL LUMBER

James V. Nevin, Aberdeen, Wash.

No Drawing. Application April 3, 1934,
Serial No. 718,873

3 Claims. (Cl. 92—21)

My present invention relates to improvements in the process of making pressed, felted, slabs, blocks, boards, sheets, and other articles from wood or woody material, as sawdust, chips, shavings, etc., disintegrated wood fiber, shredded bark, and other vegetable fibrous, ligneous material. With this prepared material I employ a synthetic resin-forming compound, as a binder, and my present invention is an improvement on and continuation of the subject matter of my Patent No. 1,899,768 of February 28, 1933.

The primary object of my invention is the production of the above mentioned articles in such simple and inexpensive manner as will insure maximum hardness and durability for the pressed, felted, porous articles, together with a high tensile and breaking strength. This compressed product may readily be penetrated by nails, screws etc., and the product may with facility be worked with ordinary carpenter tools, and in the same manner as is the case with natural wood.

The invention contemplates a lumber substitute made from wood waste, shavings, coarse saw-dust, and other fibrous materials resulting from the operations of a saw mill, and the production of a strong, resilient, compressed material therefrom, thus providing utilization of material that would otherwise be wasted.

In this specification my invention is set forth in the best mode I have thus far devised for the practical application of the principles of the process and product, but it is to be understood that the invention is not limited to this specific arrangement of steps in the process of manufacturing the article, and it is also to be understood that in and by the claims following the description I desire to cover the invention in whatever manner the process is carried out, and in whatever form of article the invention is physically embodied.

The product manufactured according to my improved process is fire-retardent, and the material possesses a very marked resistance to water. The process may include other forms of embodiment than those specifically referred to herein, and the exact process may also be varied, within the scope of my appended claims, without departing from the principles of the invention.

The process, as one of its essential features, comprises the steps of impregnating wood fibers with a potentially reactive mixture of chemicals, capable of yielding, under the simultaneous influence of heat and pressure, an infusible and insoluble resinous precipitation product that is incorporated in the finished article as a binder.

In carrying out the steps of my process, the woody material as heretofore mentioned, is placed in a suitable container of water and the material is allowed to absorb water to the saturation point, during a period of say fifteen minutes, and until the material is softened for the purpose of insuring facility in further treatment.

The softened, water-saturated material is removed from the water-bath or container, and then conveyed to a shredding machine in which the soft, saturated wood is shredded into a wet fibrous mass or mash, of long fibered, pliant, tenacious and tough material.

After having been fashioned, as described, in the shredding machine, the shredded watery-mash, or fluent mass of wood material is conveyed, or allowed to flow to a suitable straining, or draining apparatus, by means of which apparatus the excess water content is strained or drained from the mash, and at the same time extraneous substances contained in the mash or pulp of shredded material and soluble in water, are eliminated from the shredded material.

After removal of the excess water from the wood-fibers forming the mash, the latter is conveyed from the draining apparatus by suitable means, as for instance a screw conveyer, to a suitable mixing apparatus including a mixing tank, where the mash is to be treated in the presence of a novel binding solution and a regulated quantity of water.

The mixing tank is preferably of the churn type, and it is equipped with an agitator revolving on its vertical axis and provided with blades that readily pass through the fibrous mash. Preferably the lowermost blades of the rotary agitator scrape the bottom of the mixing tank, and the agitator blades are arranged and designed to impart an upward movement or circulation of the mass of material in the tank. Stationary breakers are employed in the tank for co-operation with the rotary agitator, to expedite the thorough and uniform mixing of the fibrous material with the resin-forming compound or binder, which is incorporated with the material in this mixing tank.

The resin-forming binder or compound employed in the mixing step of the process is preferably separately prepared, in solution, before being added to the batch of material in the mixing tank.

For a batch of fibrous material sufficient to produce approximately 500 square feet of wall board ⅛ of an inch thick, I employ a binding agent of approximately the following formula:

| | Kilos |
|---|---|
| Urea (by weight) | 7 |
| Formic aldehyde (solution of formaldehyde 40% by weight) | 21 |
| Meta-cresylic acid | .200 |

The urea and the 40% solution of formaldehyde are thoroughly mixed or agitated until the urea is dissolved in the solution, and then the meta-cresylic is added to this solution, and thoroughly mixed to form a combined solution. To this combined solution, I now add .080 kilo of sodium arsenate, dissolved in .500 kilo of water. These ingredients are thoroughly mixed to provide the binding agent, or resin-forming solution, for the fibrous shreds in the mixing tank.

This resin-forming solution, or binder, is added to the batch in the mixing tank, and a regulated quantity of water is also added to the batch, sufficient to float the wood fiber in the tank, and render the contents of the tank fluent and readily susceptible to the means for agitating and mixing the solution with the fiber.

The tank is preferably equipped with a tight fitting cover, and the rotary agitator is set in motion to mix the contents of the tank so that the fibrous material is thoroughly saturated and impregnated with the binding solution. The batch as thus described is constantly stirred or agitated for approximately an hour, and of course any multiple of this batch may be mixed with a proportionate quantity of the binder and added water for a proportionate time.

In this step of mixing, the fibrous ligneous aggregate absorbs or becomes impregnated with binder in solution, and the aggregate is thereby held in an inert mass. The total mass of ingredients forming the binder compound thus employed, is relatively small compared with the woody aggregate, and hence when the woody aggregate and the binder ingredients are thoroughly mixed, the fibrous material is found to be in a thoroughly impregnated state.

The impregnated material is next conveyed to and deposited in a pressure-cooker, or steam-heating apparatus of suitable type, where indirect steam is applied to the impregnated wood fibers until the temperature reaches the boiling point of water, and this temperature is then maintained for a period of approximately fifteen minutes.

Due to this excessive heating or cooking, the natural sugars, gummy albuminous matter, resins, combined with acids, volatile and essential oils of the woody material, are combined by chemical reaction with the added binding solution, to form a binding agent with which the fibrous material is thoroughly impregnated.

This impregnated, semi-fluid mass is now fashioned into a soft board, slab, or other shape, in the nature of a felted, interwoven, interlaced, porous condition, which avoids the laminated effect common to most wall boards now in use. For the formation of the soft board or sheet, the material is allowed to flow onto a heavy wire screen, which screen forms part of a forming machine. By the use of suitable mechanism the screen is vibrated, and the floating material thereon is thus fashioned into the soft sheet, slab or board of the nature described.

During this step in the formation of the soft board or sheet, while the sheet is supported on the screen or reticulated vibrator, the excess binding agent, and excess water are strained or drained from the sheet into a suitable receptacle, and this recovered excess solution may be again employed with a subsequent batch of the wood fiber. Suction boxes may be employed, if desired, to expedite this draining of excess material from the soft sheet or board.

After their formation on the heavy wire screens, these soft sheets or boards are transferred to a suitable drying chamber, where moisture is evaporated until the moisture-content of the soft boards or sheets is reduced to from 8% to 15%.

The soft, moist board or sheet is now ready for the press, and the board or sheet is therefore removed from the screen, placed in a metallic frame provided therefor, and transferred by a suitable carrier onto the multiple platen of a hydraulic press. In the press the soft board or sheet is exposed to the simultaneous actions of heat and pressure, until the fibrous particles are compressed into one unitary, flexible sheet, board, or slab, having the chemical characteristics of the original wood.

The pressure applied to the soft sheet may vary, as from 500 lbs. to 1000 lbs. per square inch, and the temperature of the heat applied during the pressing action on the sheet or board may also vary, as from 100° to 180° centigrade, the pressure and heat of course, both being applied to the fiber and the binder making up the sheet or board.

The simultaneous application of heat and pressure results in a chemical reaction between the formaldehyde, urea, meta-cresylic acid, and sodium arsenate, and the resin-forming ingredients of the wood fibers, and the whole forms a precipitate or condensate similar to resin, the precipitate being hastened or accelerated by the presence and influence of the sodium arsenate, which latter acts as a mild catalytic agent in the chemical changes of the binder ingredients. When precipitation takes place, under the applied heat and pressure, the ingredients going to make up the binder throughout the material, in the aggregate, and between the aggregate, are coalesced into a homogeneous mass, which mass is practically insoluble and infusible.

Under the simultaneous action of heat and pressure, I find that from one to five minutes is sufficient time to accomplish the desired chemical reaction.

During the period in which the heat and pressure are applied to the soft sheet to cause the precipitation of the synthetic resin which forms the binder, the small percentage, of water present in the soft sheet or board before pressing, is expressed therefrom and permitted to escape. This release of excess water may be accomplished by momentarily releasing the hydraulic pressure of the press, after which the pressure is again applied.

The pressed, dried boards are now removed from the press, free from all traces of moisture, and they possess a hard, smooth, polished surface on both sides. An even and uniform texture is present throughout the entire area of the board, and there is no breaking down of the fiber, which would result in a fine dust as is the case with many similar boards now on the market.

The boards made according to the described process are water-resistant, free from warp or distortion, and the compressed product may be employed to form partitions, walls, or ceilings of buildings and similar structures.

Slabs, boards, or sheets made in accordance with the present invention may vary in size from a few feet square, to as large as six feet by three feet wide, or wider, depending, of course, entirely upon the size and power of the press. It is within contemplation of the invention to produce boards as large as six feet by twelve feet, which, of course, requires a powerful substantially constructed press.

It should be noted that the present process distinguishes sharply from processes wherein previously formed synthetic or natural resins are used in admixture with fillers, such as wood fillers, for the formation of compressed products. In the processes of the prior art, it was always necessary to employ a very much larger percentage of the resins, or synthetic resins, and it was usually the practice to impregnate flour with the resin.

By the present method of my invention, and contrary to the teaching of the prior art, the formation of the resin and the insoluble binder resulting therefrom, takes place on the fiber from the wood waste or wood fiber when the solution of the combined natural and synthetic binding agents are diluted with water added to the batch. Therefore, in my process, a much smaller amount of binder is required than in any other process known to the inventor. This is an important feature, as it is instrumental in the production of commercial products at an extremely low cost and by the use of very simple means.

The ingredients of the binder are subjected to chemical reaction during the cooking step of the process, and the chemical reaction is continued when the soft sheet or board is pressed in the presence of heat, so that the condensation is polymerized into its final insoluble and infusible state while the sheet or board is in the press. The binder thus serves to cement together the particles of wood fiber into a coherent, grainless, structurally strong and tough final product.

It is also within the province of my invention to mix coloring matter, preferably in dry form, such as pigment, with the woody material, for coloring purposes. For example, a small amount of carbon black, graphite, or other black pigment might be added; or a white pigment, such as titanium, oxide, zinc white, and the like might be added, whereby a colored product showing the characteristics of the added pigments will result. Or the fibrous woody material may be placed in a beater with the binding agent and a coloring matter, and the mass mixed and thoroughly commingled into a homogeneous mash that is free from the trace of wood.

A further alternative is to provide a dyed wood, or other waste of various colors, and place the same in the metallic frame heterogeneously, i. e. there may be two or three different colors heterogeneously disposed, no attempt being made to secure a uniform mixture during the compressing operation. This will form areas of different colored materials, which will retain their individuality, and yield a mottled or variegated product of a very pleasing appearance.

Having thus fully described my invention, what I claim as new and desire to secure by Letters Patent is:—

1. Artificial lumber comprising from 70% to 95% of fibrous woody material and from 5% to 30% of an infusible final condensation product of urea, meta-cresylic acid formaldehyde and the natural binders present in the woody material, said fibrous woody material being thoroughly impregnated with and agglomerated by said resin.

2. Artificial lumber comprising a major portion of fibrous woody material having the fibers thereof impregnated with and bonded together by a minor portion of an infusible binder composed of the reaction product of urea, cresylic acid, an aldehyde and the natural binders present in the woody material.

3. Artificial lumber comprising 70 to 95% fibrous wood, having the fibers thereof impregnated with and bonded together by from 5 to 30% of an infusible binder composed of the reaction product of urea, meta cresylic acid, formaldehyde and the natural binders present in the fibrous wood.

JAMES V. NEVIN.